(12) United States Patent  
Moyer et al.

(10) Patent No.: US 8,386,747 B2  
(45) Date of Patent: Feb. 26, 2013

(54) PROCESSOR AND METHOD FOR DYNAMIC AND SELECTIVE ALTERATION OF ADDRESS TRANSLATION

(75) Inventors: William C. Moyer, Dripping Springs, TX (US); James B. Eifert, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 480 days.

(21) Appl. No.: 12/483,051

(22) Filed: Jun. 11, 2009

(65) Prior Publication Data

US 2010/0318761 A1 Dec. 16, 2010

(51) Int. Cl.
| | |
|---|---|
| G06F 13/00 | (2006.01) |
| G06F 13/28 | (2006.01) |
| G06F 9/46 | (2006.01) |
| G06F 9/00 | (2006.01) |
| G11C 8/00 | (2006.01) |

(52) U.S. Cl. ............... 711/207; 711/220; 711/E12.061; 718/108; 712/226; 365/230.01

(58) Field of Classification Search ................ 711/207, 711/220, E12.061; 718/108; 712/226; 365/230.01
See application file for complete search history.

(56) References Cited

U.S. PATENT DOCUMENTS

| | | | |
|---|---|---|---|
| 4,373,179 A | 2/1983 | Katsumata | |
| 4,888,688 A | 12/1989 | Hartvigsen et al. | |
| 5,564,052 A | 10/1996 | Nguyen et al. | |
| 6,581,130 B1 | 6/2003 | Brinkmann, Jr. et al. | |
| 6,725,289 B1 | 4/2004 | Waldspurger et al. | |
| 7,401,201 B2 | 7/2008 | Moyer et al. | |
| 7,447,867 B2 | 11/2008 | Soja et al. | |
| 2003/0204702 A1 | 10/2003 | Lomax et al. | |
| 2004/0268044 A1 | 12/2004 | Heller et al. | |
| 2007/0198805 A1* | 8/2007 | Soja et al. | 711/202 |
| 2007/0283123 A1* | 12/2007 | Vick et al. | 711/207 |

OTHER PUBLICATIONS

PCT Application No. PCT/US2010/035101; Search Report and Written Opinion dated Dec. 28, 2010.

* cited by examiner

*Primary Examiner* — Edward Dudek, Jr.
(74) *Attorney, Agent, or Firm* — Zagorin O'Brien Graham LLP

(57) ABSTRACT

Non-intrusive techniques have been developed to dynamically and selectively alter address translations performed by, or for, a processor. For example, in some embodiments, a memory management unit is configured to map from effective addresses in respective effective (or virtual) address spaces to physical addresses in the memory, wherein the mappings performed by the memory management unit are based on address translation entries of an address translation table. For a subset of less than all processes, entry selection logic selects from amongst plural alternative mappings coded in respective ones of the address translation entries. For at least some effective addresses mapped for a particular process of the subset, selection of a particular address translation entry is based on an externally sourced value. In some embodiments, only a subset of effective addresses mapped for the particular process are subject to dynamic runtime alteration of the address translation entry selection.

20 Claims, 4 Drawing Sheets

PROCESSOR AND METHOD FOR DYNAMIC AND SELECTIVE ALTERATION OF ADDRESS TRANSLATION

BACKGROUND

1. Field

The present invention relates generally to data processors, and more particularly to processor implementations and address translation techniques that facilitate dynamic and selective alteration of memory mappings.

2. Related Art

Data processing systems typically execute programs and operate on data represented in addressable memory locations that are themselves mapped to physical storage using virtual memory, segmentation, paging or other related techniques. In some applications or deployments, it may be desirable to alter a mapping based on some external source or signal. One such example is in control systems implemented using embedded- or microcontroller-type processors. In some control system applications, calibration processes may be employed whereby parameters of a control system algorithm are tuned. Because calibrations are typically, and sometime necessarily, performed in real time, update techniques that involve interruption of the processor may, in effect, perturb the closed-loop system that is being calibrated or tuned. Accordingly, conventional intrusive techniques whereby a processor is halted or interrupted and in-memory parameters are directly updated, e.g., via debug or scan port facilities or using software, may not be suitable in all cases.

BRIEF DESCRIPTION OF THE DRAWINGS

The present invention is illustrated by way of example and not limitation with reference to the accompanying figures, in which like references generally indicate similar elements or features.

Figure 1:
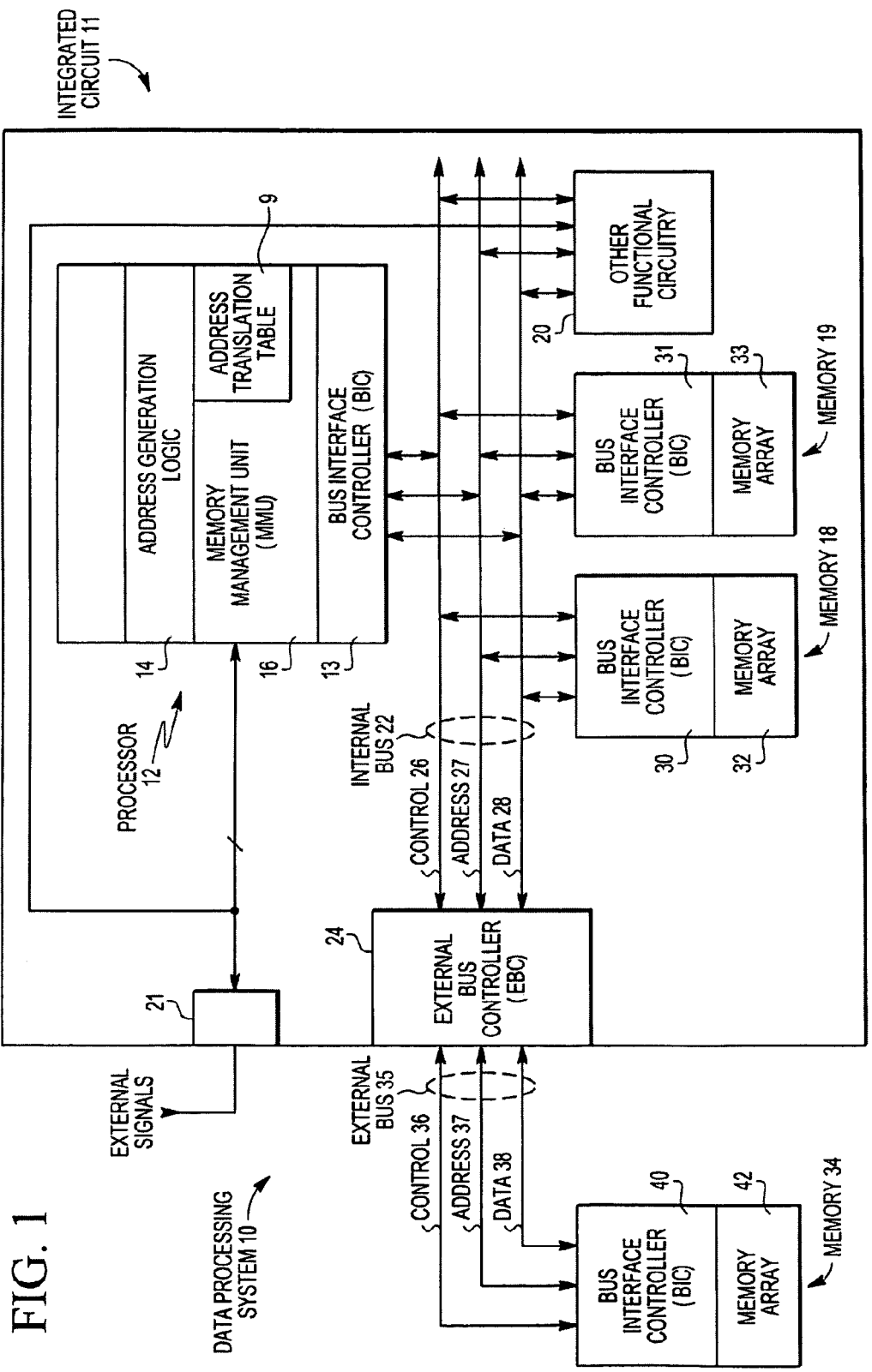
FIG. 1 is a block diagram of a data processing system in accordance with some embodiments of the present invention.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DETAILED DESCRIPTION

Non-intrusive techniques have been developed to dynamically and selectively alter address translations performed by, or for, a processor. For example, in some embodiments, a memory management unit is configured to map from effective addresses in respective effective (or virtual) address spaces to physical addresses in the memory, wherein the mappings performed by the memory management unit are based on address translation entries of an address translation table. For a subset of less than all processes, entry selection logic selects from amongst plural alternative mappings coded in respective ones of the address translation entries. For at least some effective addresses mapped for a particular process of the subset, selection of a particular address translation entry is based on an externally sourced value. In some embodiments, only a subset of effective addresses mapped for the particular process are subject to dynamic runtime alteration of the address translation entry selection.

For some applications, systems and/or processor implementations, such techniques (or variations thereon) can be used to facilitate calibration or tuning of parameters, such as in a real time closed-loop control system or in other systems susceptible to perturbation based on conventional intrusive update techniques. For example, in some control system applications, coherent sets of control values or filter coefficients may be stored in memory resident tables that reside at different physical page addresses. Building on techniques described herein for dynamically and selectively altering address translations, it is possible to switch (in real time and without processor intervention) from one coherent set to another. For example, while control system algorithms are executing using an active set of filter coefficients or other control system values, hardware debug and/or test facilities may be used to modify filter coefficients in an inactive one of the sets and then dynamically select alternative address translation entries to instead map memory containing the modified filter coefficients. In general, the externally sourced values that drive selection amongst address translation entries may include external signals received from an off-chip source, programmable values settable by hardware or software external to a memory management unit and processor core, or signals, events or values supplied by a debug or in-circuit test facility.

For concreteness of description, we focus on certain illustrative memory, tasking, and process-centered address space models. For example, in much of the description herein, effective-to-physical address translations are consistent with a page-oriented virtual memory model and, consistent with process-oriented address spaces, process or task identifiers are used as part of a tag to match particular address translation entries in a table thereof maintained for use by a memory management unit. Of course, embodiments of the present invention are not limited to the illustrated memory models, to any particular terminology for a mapped from address (be it effective, logical, virtual, etc.) or address portion, to process-centered address spaces or to any particular execution model.

As used herein, process identifiers denote a process, task or address space identifier that, prior to alteration, transformation or mapping based on an externally sourced value, may be associated with a process, task or thread of execution, whereas a task identifier refers to an identifier used as part of tag for lookup on a table or other representation of address translation entries. In this regard, the term task identifier is a somewhat arbitrary definitional construct. Task identifiers may be altered, transformed or mapped counterparts of process identifiers and as described herein with respect to some embodiments of the present invention, may be dynamically and selectively altered, transformed or mapped based on an externally sourced value. Thus, process identifiers and task identifiers are definitional constructs useful for describing a set of illustrative embodiments and are in no way meant to proscribe coverage of the appended claims with respect to any particular processor technology or instruction set architecture that may use or emphasize specific terminology such as process identifier (PID), task identifier (TID), address space identifier (ASID) or the like in its description or documentation of an execution model.

Techniques described herein have broad applicability to computational systems in which the dynamic and selective alteration of address translations based on an externally sourced value (or values) may facilitate design, debug, test, calibration, tuning or other applications or situations in which a dynamically selectable overlay of mapped memory is desirable or useful. Accordingly, reference to applications for calibration and/or tuning of a control system wherein alternatively coherent sets of parameters and/or filter coefficients are represented in physical memory pages mapped via dynamically selectable alternative translation entries implementation is merely illustrative. In view of the foregoing and without limitation on the range of memory models and address spaces; representations and/or caching of address translations; and/or underlying processor or computational system architectures or applications thereof that may be employed, we describe certain illustrative embodiments.

Systems and Integrated Circuit Realizations, Generally

Referring to FIG. 1, in some embodiments of the present invention, a data processing system 10 includes an integrated circuit 11 having a processor 12, a memory 18, a memory 19, other functional circuitry 20, and external bus controller (EBC) 24 which are bi-directionally coupled by way of an internal bus 22. The internal bus 22 includes control signal paths 26, address signal paths 27, and data signal paths 28. The processor 12 includes a bus interface controller (BIC) 13 which bi-directionally couples the processor 12 to the control signal paths 26, address signal paths 27, and data signal paths 28. Use of bus-type interconnect technology and depiction of a single processor are for simplicity of illustration only. Indeed, embodiments that employ multiprocessor, multi-core, system on a chip (SoC) and multipath interconnect fabric technologies are all contemplated and will be understood by persons of ordinary skill in the art based on the description herein. In some embodiments, integrated circuit 11 may include additional features consistent with a multi-core SoC design.

In the illustration of FIG. 1, memories 18 and 19 each include respective memory arrays 32, 33 and bus interface controllers (BICs) 30, 31. BIC 30 bi-directionally couples memory 18 to control signal paths 26, address signal paths 27, and data signal paths 28. BIC 31 bi-directionally couples memory 19 to control signal paths 26, address signal paths 27, and data signal paths 28. In some embodiments, memories 18 and 19 may be configured as on-chip cache memory. Other functional circuitry 20 is also bi-directionally coupled to control signal paths 26, address signal paths 27, and data signal paths 28. In some embodiments, other functional circuitry 20 may include in-circuit test, trace, emulation and/or debug circuitry. External bus controller (EBC) 24 is also bi-directionally coupled to control signal paths 26, address signal paths 27, and data signal paths 28. In the illustration of FIG. 1, EBC 24 is configured as a memory controller interface to off-chip memory 34; however, more generally, facilities provided by EBC 24 may be extended, replaced by, or interfaced with host or I/O bridges and/or additional layers of interconnect.

Note that in some embodiments of the present invention, functional blocks such as processor 12, memory 18, memory 19, other functional circuitry 20, and EBC 24 may be coupled to any desired portions of the internal bus 22 (or to any desired portions or ports of an alternative interconnect fabric) which allow these blocks to perform their respective functions. Thus in some embodiments, not all of the elements associated with reference numbers 12, 18-20, and 24 need be coupled to all of the signals of any particular internal bus or interconnect.

Processor 12 includes any of a variety of logic and instruction execution units typical of modern processor design. In general, processor 12 fetches instructions and accesses data from memory (e.g., in addressable storage locations of one or more of memories 18, 19 and 34). To provide a useful context for illustration, address generation logic 14 together with a memory management unit (MMU) 16 and one or more associated address translation tables are separately illustrated. In general, effective memory addresses used by processor 12 in the course of instruction fetch and data accesses (e.g., read- and write-type accesses) are calculated in accord with any operant addressing modes and presented to MMU 16 for mapping to corresponding memory locations in physical memory. Address arithmetic and related operations are performed by logic illustrated collectively as address generation logic 14 (although persons of ordinary skill in the art will appreciate that, in some embodiments, such logic may be distributed amongst a variety of functional blocks such as instruction fetch logic, load/store units, etc.)

In general, the form of effective addresses and the particular mappings to physical addresses performed by MMU 16 are implementation dependent, but will be understood by persons of ordinary skill in the art relative to any of a variety of conventional mappings from effective (or virtual) addresses to physical storage locations using virtual memory, segmentation, paging or other related techniques. As used herein, the term effective address is meant to encompass any effective, logical, virtual or other mapped-from address without regard to any particular processor technology or instruction set architecture that may use or emphasize specific terminology such as process, logical address, virtual address or the like in its description or documentation of a memory model. MMU 16 translates effective addresses to physical addresses for accesses (via the illustrated bus interconnect facilities, included bus interface controller 13). For concreteness of description, and without limitation, effective-to-physical address translations performed by MMU 16 will be understood in accord with a page-oriented virtual memory model and, consistent with process-oriented address spaces in many modern processor architectures, process or task identifiers are used as part of a tag to match particular address translation entries in a translation lookaside buffer thereof (e.g., address translation tables 9) maintained for use by a MMU 16.

As will be understood by persons of ordinary skill in the art, the location of MMU 16 is merely illustrative. Although inclusion of MMU 16 and address translation table 9 with processor 12 is appropriate and/or convenient for some designs, in others, analogous memory management unit and address translation table may be located elsewhere in data processing system 10. In addition, it will be appreciated that in some designs consistent with the present description, address translation table 9 may be configured as a translation lookaside buffer and underlying address translations may be represented in tables (e.g., in multiple levels of page tables) from which a current working set of translations is cached. Page tables, translation lookaside buffers and related techniques are well understood in the art and, based on the description herein, persons of ordinary skill in the art will understand realizations of the present invention wherein address translation table 9 constitutes a translation lookaside buffer or some other aggregation of address translation entries within a larger memory management architecture.

In general, other functional circuitry 20 may perform any of a variety of desired functions, including I/O and other functions relative to in-circuit test, trace, emulation and/or debug techniques. Additional examples of functions which may be provided by other functional circuitry 20 include timers, interrupt handling, an input/output port, a communications port (e.g. a serial communications port, a serial peripheral interface, etc.), drivers (e.g. Liquid Crystal Display drivers), analog-to-digital (A/D) conversion, digital-to-analog (D/A) conversion, additional memory, and Direct Memory Access (DMA).

In some embodiments, externally sourced signals are supplied to one or more integrated circuit pins 21 of integrated circuit 11. A signal path is provided between the integrated circuit pin 21 and an input of a memory management unit 16, which in the illustration of FIG. 1 is integral with processor 12. Also, a bidirectional signal path is provided between the integrated circuit pin 21 and an input/output terminal of other functional circuitry 20. In some embodiments, externally sourced signals are supplied via other functional circuitry 20.

External bus controller (EBC) 24 is used to bi-directionally couples internal bus 22 and external bus 35. As before, bus-type interconnect technology is illustrated for simplicity and other interconnect technologies may be deployed on either side of the EBC 24, whereupon the moniker "bus controller" or "bus interface" may be understood purely as a matter of historical convention and not as a requirement that bus-type interconnect technology be employed. Referring to FIG. 1, integrated circuit 11 is bi-directionally coupled to memory 34 by way of an external bus 35. External bus 35 includes control signal paths 36, address signal paths 37, and data signal paths 38. Memory 34 includes a memory array 42 and a bus interface controller (BIC) 40. BIC 40 bi-directionally couples memory 34 to signal paths of external bus 35. In some embodiments, memory 34 and integrated circuit 11 are implemented on different integrated circuits. In general, depending on design goals, various portions of the data processing system 10 may be implemented on the same or different integrated circuits.

Data processing system 10 has been illustrated as having memories 18, 19, and 34, and (in general) address translations subject to dynamic and selective alteration in some embodiments of the present invention may include translations from effective addresses to physical addresses represented in one or more of the aforementioned memories. For avoidance of doubt, the illustrated set and configuration of memories implemented on integrated circuit 11 (e.g., memories 18 and 19) together with any implemented external to the integrated circuit 11 (e.g., memory 34) are purely illustrative. Other and/or additional memory may be employed (though not explicitly shown), including levels of cache memory in accordance with any desired memory hierarchy. For example, although not specifically shown in FIG. 1, data and/or instruction caches may be provided integral with processor 12, particularly in designs that include multiple processors and/or cores and multipath, point-to-point on-chip interconnect fabrics. Finally, memory 18, memory 19 and the memory 34 (together with any additional memories riot explicitly shown) may be of any suitable type including, but not limited to static random access memory (SRAM), dynamic random access memory (DRAM), read only memory (ROM), erasable programmable read only memory (EPROM), electrically erasable programmable read only memory (EEPROM), magnetic random access memory (MRAM), etc. Memories 18, 19 and 34 may be of the same, similar, or different types.

Dynamic and Selective Alteration of Address Translations

Figure 2:
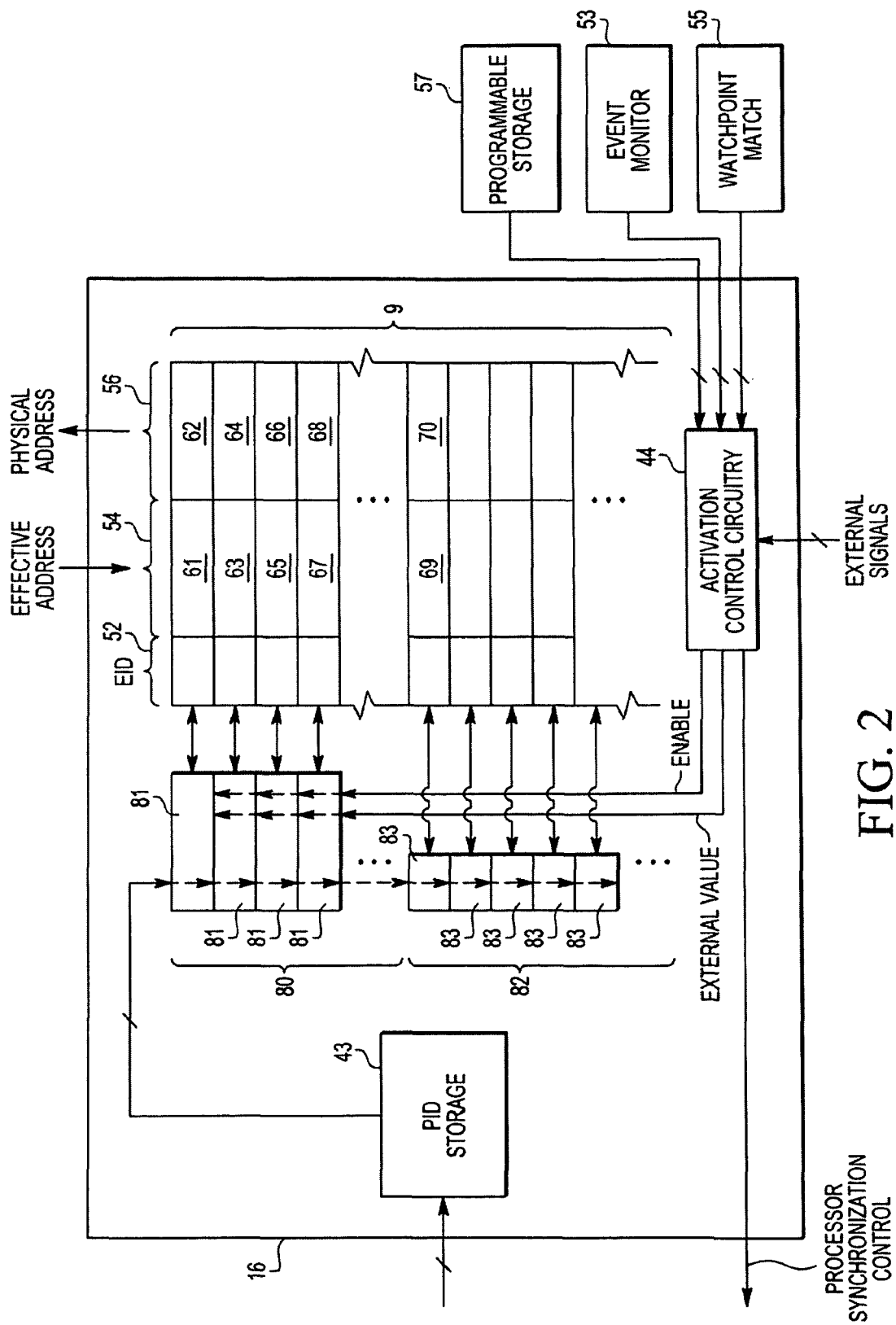
FIG. 2 is a block diagram of a memory management unit (MMU) including an address translation table and entry selection logic suitable for use in accordance with some embodiments of the present invention.

FIG. 2 illustrates in greater detail embodiments of memory management unit (MMU) 16 and address translation table 9 previously described with reference to FIG. 1. Of course, notwithstanding the illustration of FIG. 1, MMU 16 and address translation table 9 may (in other designs) reside elsewhere along an address path in which effective addresses are translated to physical addresses. Furthermore, in some embodiments in accordance with the present invention, the described techniques for dynamic and selective alteration of address translations may be exploited in other forms or types of memory management units, such as input/output memory management units (IOMMUs or peripheral access memory management units, PAMUs, etc.). Nonetheless, in the interest of clarity, though without limitation, operation of MMU 16 and address translation table 9 are described in accord with the illustrative context provided by FIG. 1 and its accompanying description.

In the illustration of FIG. 2, effective address values are shown as inputs and physical address values are shown as outputs relative to fields represented in entries of address translation table 9. As is conventional, a portion of an effective address (such as an effective page number) is used to lookup a corresponding portion (such as a physical page number) of the physical address. Additional details such as steering logic to direct a relevant page offset portion of an effective address into corresponding positions in the physical address are omitted for clarity and simplicity. In some embodiments, address translation table 9 is implemented as a translation lookaside buffer (TLB) and the implemented TLB uses content addressable memory (CAM) to facilitate a lookup tag match against corresponding portions of individual entries of address translation table 9. In such embodiments, a useful lookup tag match can involve both a process, task or address space identifier and a page number portion of the effective address.

Typically, the process, task or address space identifier is sourced from PID storage 43 for comparison against contents of an effective identifier (EID) field 52, while a page number portion of the effective address is compared against contents of virtual page number field 54. In general, PID storage 43 may be programmable or may be maintained based on information received from processor logic in accord with a tasking or scheduling model implemented thereby. For simplicity of description, and without loss of generality, such an identifier is hereafter referred to as a process identifier (PID). For a subset of address translations, an effective process, task or address space identifier is computed by modifying a PID value based on an externally sourced value and instead using the modified PID in the lookup tag match against contents of EID field 52. In each case, a particular entry of address translation table 9 is selected based on correspondence with contents of an effective identifier (EID) field 52 and virtual page number field 54. The physical page field 56 of an entry so selected is supplied for use in the physical address. In some embodiments, the selection of an address translation entry for which a modified PID value is used, rather than an unmodified PID value, is based at least in part on one or more predetermined values of the stored contents of the EID field in the address translation entry. In the illustrated embodiment, this determination may be made by logic contained within the individual selection logic 81 of a subset of address translation table 9 entries.

In general, lookup tag match can be understood in terms of two constituent aspects: (1) match of a PID (or modified PID) with contents of an effective identifier (EID) field 52 and (2) match of a page number portion of an effective (or logical)

address with contents of a virtual page number field 54. Thus, for a given memory access, an operant PID and a corresponding page number are used as an effective tag to identify a corresponding entry in address translation table 9. Because value comparisons for page number matches are straightforward and largely conventional, comparison logic is not explicitly illustrated relative to contents (61, 63, 65, 67 . . . 69 . . . ) of respective page number fields 54. Rather, the illustration of FIG. 2 focuses instead on instances of selection logic to match EID field 52 contents while selectively modifying a subset of PID values based on an externally sourced value (or values).

In some embodiments, instances of selection logic 81 include logic to selectively and partially overload (or otherwise modify) lower order bits of operant PIDs within an individual entry of address translation table 9 to form an effective PID value. Selection may be based on one or more predetermined values stored in EID field 52 of the individual entry of address translation table 9. Modification may be based at least in part on externally sourced values. Resulting modified PIDs are used in value comparisons against contents of respective EID fields 52. In some embodiments, selection logic 83 omits the selective partial overload (or other PID modification) features implemented in instances of selection logic 81, thereby providing a straightforward compare of an unmodified PID value against contents of respective EID fields 52. Thus, in some embodiments, a first subset 80 of address translation entries have associated instances of selection logic 81 that provide for selective PID modification, while a second subset 82 of address translation entries have associated instances of selection logic 83 that need not support selective PID modification.

Address translation entries used to code a plurality of alternative mappings selectable based on externally sourced values should be placed in respective entries of subset 80. Stated differently, for a subset of processes or tasks for which dynamic alteration of the operant address translation is desired, sets of alternative mappings should be coded using address translations that reside in entries of subset 80. For those processes or tasks for which dynamic alteration of the operant address translation is not desired or is unneeded, mappings need not be coded in entries of subset 80.

In the illustration of FIG. 2, activation control circuitry 44 includes a plurality of input vectors for externally sourced values. For example, activation control circuitry 44 has an input for receiving externally sourced values such as signals conveyed via input pin 21 of integrated circuit 11. Activation control circuitry 44 also has additional inputs for receiving externally sourced valued via intermediaries or from other sources. For example, in some embodiments, activation control circuitry 44 receives values written to programmable storage 57 (e.g., a register file or other storage device) via a test interface or debug port or using debug control logic. In some embodiments, a JTAG (Joint Test Action Group) TAP (Test Access Port) interface or NEXUS (the widely used IEEE standard for debug of processor and digital system architectures) debug port may be included to support the debug control function.

In some embodiments, event inputs may be received from an event monitor 53 and/or watchpoint match signals may be received from watchpoint match circuitry 55. In general, inputs from programmable storage 57, event monitor 53 and/or from watchpoint match circuitry 55 are sourced from sources external to both MMU 16 and processor 12. In some embodiments, all or part of the implementation of event monitor 53, watchpoint match 55, and programmable storage 57 may reside within processor 12, or elsewhere within a component of integrated circuit 11. Whatever the source, activation control circuitry 44 is configured to supply external values to instances of selection logic 81 for use, in selected cases, in modifying PIDs prior to comparisons against contents of respective EID fields 52.

An enable signal is also provided and, in general, may be triggered by occurrence of a triggering mechanism. For example, an event may be generated by event monitor 53 or watchpoint match circuitry 55. In general, watchpoint match circuitry 55 and/or event monitor 53 are of any of a variety of conventional designs and support any of a variety of alternative ways to detect occurrence of predetermined events such as when predetermined address is accessed or a predetermined execution event occurs. The predetermined event may be one of numerous types of events that can be detected based on internal states or can be triggered by external signals, including e.g., signals conveyed via input pin 21 of integrated circuit 11. A signal from an external tool (not shown) is one type of event. Another example is a signal from an external ASIC (application specific integrated circuit). Programmable storage 57 provides additional alternatives for externally sourced values that can be used by activation control circuitry 44. A NEXUS debug port (not shown) may be used to provide a scan path for values introduced into programmable storage 57. It will be apparent to persons of ordinary skill in the art, based on the description herein, that any of a variety of mechanisms for providing activation control circuitry 44 with externally sourced values may be provided including memory-mapped registers which can be altered by a direct memory access controller in other functional circuitry 20. In general, variations suitable for triggering activation based on a real-time system event, a breakpoint address match, a watchpoint match and/or any other monitored function are contemplated.

In some embodiments, activation control circuitry 44 also provides a processor synchronization control signal. The synchronization control may be triggered coincident with the enable signal or with other transitions to facilitate coherent accesses to memory. In this way, completion of in flight accesses may be coordinated to ensure a coherent transition between address translation entries selected based on a charged externally sourced value or between modified and unmodified PID operations. Synchronization control may also be used to flush instruction pipeline stages and/or instruction prefetch buffers, if implemented. In some embodiments, additional synchronization operations involving other logic within data processing system 10 may be triggered by activation control circuitry 44.

Figure 3:
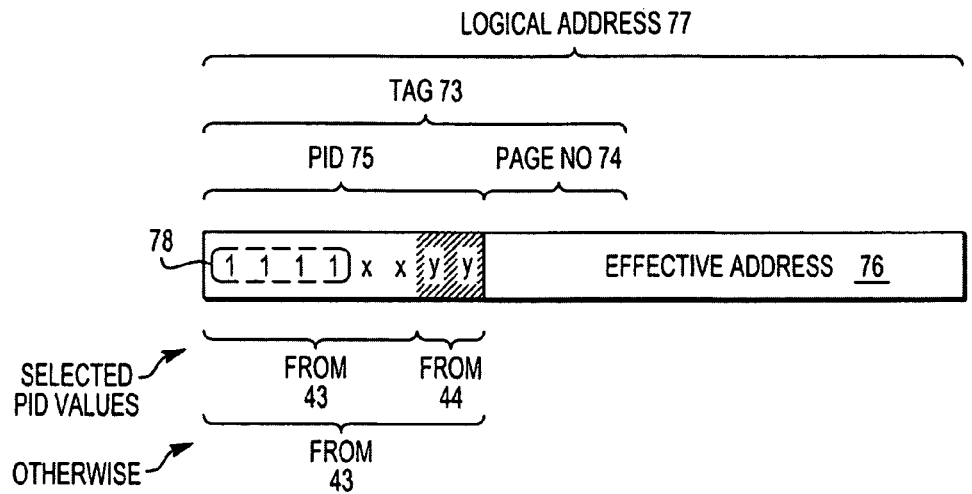
FIG. 3 illustrates in diagrammatic form an effective address format for which runtime address translation by a memory management unit (MMU) such as illustrated in FIG. 2, may be dynamically altered in accordance with some embodiments of the present invention and based on an externally sourced value.

FIG. 3 depicts an effective address format for which runtime address translation by a memory management unit (MMU) may be dynamically altered in accordance with some embodiments of the present invention and based on an externally sourced value. In particular, FIG. 3 illustrates a tag portion 73 of logical address 77 that includes an identifier 75 and a page number portion 74 of the effective address. As is conventional in many processor designs, identifier 75 may correspond to a process, task or address space identifier portion of the effective address that facilitates implementation of at least partially distinct address spaces for individual processes or tasks.

In general, identifier 75 of logical address 77 is sourced from PID storage 43 as previously described and allows the same effective address value (see effective address portion 76) to resolve to different pages of physical memory (via different address translation entries in address translation table 9) when accessed by different processes or tasks or based on different address space identifiers. However, a portion of the tag value coding space, e.g., that indicated by a reserved value such as 1111 in the upper order bits 78 thereof, can be used to direct instances of selection logic 81 to modify the value from PID storage 43 based on externally sourced value(s). Accordingly, as illustrated, in some embodiments and for some portions of the tag value coding space, a portion (e.g., lower order bits of identifier 75 illustrated as yy) may correspond to the externally sourced values supplied via activation control circuitry 44.

Figure 4:
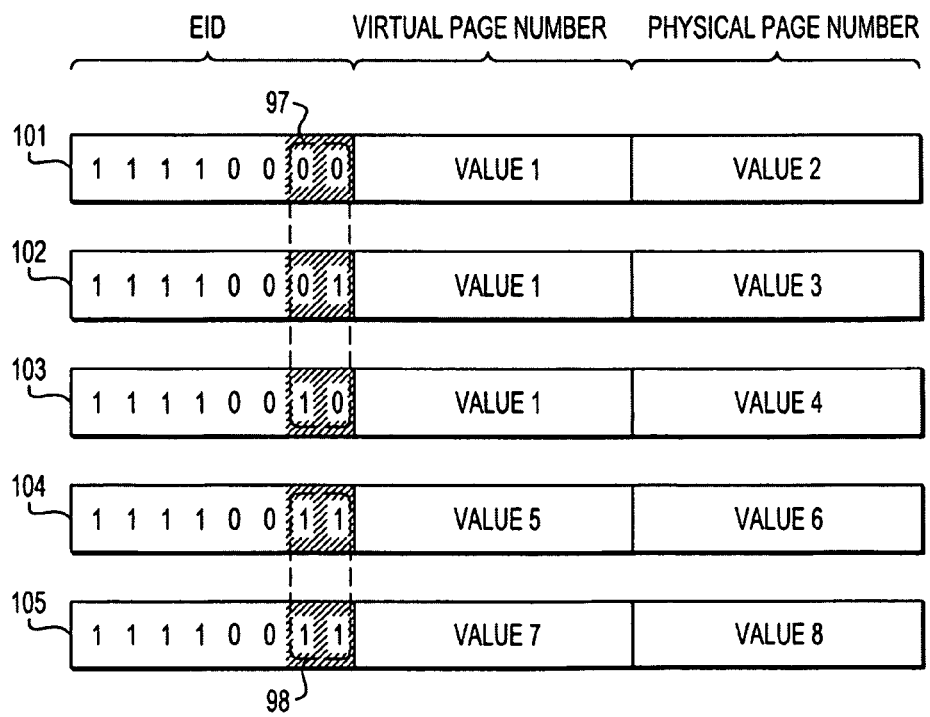
FIG. 4 illustrates in diagrammatic form a variety of address translation entries that may be maintained, in some embodiments of the present invention, in an address translation table such as illustrated in FIG. 2.

In this way, up to four (4) alternative translations may be selected based on externally sourced values, or as in some embodiments, three (3) alternative translations with one coding (yy=11) that matches without regard to the externally sourced values. For example, referring to FIG. 4, three alternative translation entries (101, 102, 103) are illustrated for a memory access targeting an effective address that includes a tag portion with EID value of 111100yy and virtual page number of VALUE1. The first, entry 101, codes a translation from virtual page VALUE1 to physical page VALUE2. The second, entry 102, codes a translation from virtual page VALUE1 to physical page VALUE3. The third, entry 103, codes a translation from virtual page VALUE1 to physical page VALUE4. Selection of an appropriate translation is based on correspondence between the externally sourced values and the particular values 97 coded in each of the three alternative translation entries.

In this way, and consistent with a control system calibration or tuning example, a first active set of control parameters and/or filter coefficients may be coded in physical page VALUE2 and selected for a process or task with a PID value (from PID storage 43) of 111100zz, where zz is ignored and where a value of 00 is overloaded (by an instance of selection logic 81) over zz based on externally sourced values. An alternative (and inactive) set of control parameters and/or filter coefficients coded in physical page VALUE3 may be updated or tuned and thereafter activated by changing externally sourced values to instead overload a value of 01 over zz (again by operation of an instance of selection logic 81).

With regard to entries 104 and 105, a coding (yy=11) in 98 is used to code a match without regard to externally sourced values. Thus, to accommodate instruction pages that need not be replicated in multiple counterparts for the process or task with a PID value of 111100zz, entry 104 codes a translation from virtual page VALUE5 to a physical page VALUE6 that contains executable code. Similarly, to accommodate data pages that need not be replicated in multiple counterparts for the process or task with a PID value of 111100zz, entry 105 codes a translation from virtual page VALUE7 to a physical page VALUE8 that contains data. Entries 104 and 105 code address translations that match without regard to externally sourced values and without regard to changes in externally sourced values otherwise used to select amongst physical page VALUE2, physical page VALUE3 and physical page VALUE4, when translating from virtual page number VALUE1.

Referring again to the illustration of FIG. 3, those bits of identifier 75 illustrated as xx are unaffected by the selective overload based on externally sourced values. This allows for up to four individual and distinct processes to utilize the selective overloading capability, with independent overlay capability for each of the processes. In other embodiments, larger or smaller portions of tag value coding space may be subject to overload with externally sourced values. For example, lesser or greater portions of identifier 75 may be used to code a reserved value and/or additional reserved values may be recognized. In other embodiments, greater or lesser numbers of alternative translations may be supported and greater or lesser diversity of externally sourced values may be accommodated.

Figure 5:
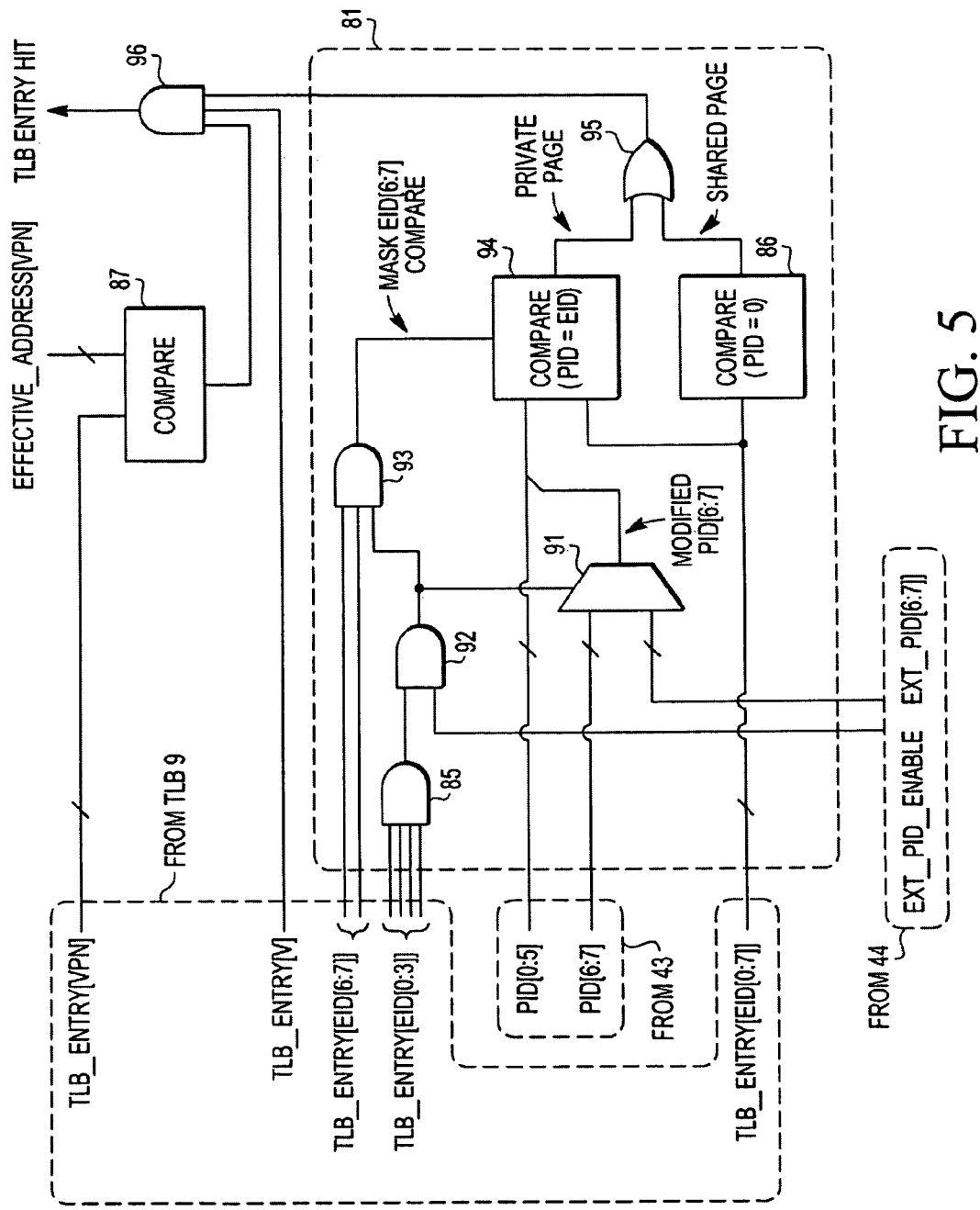
FIG. 5 is a logic diagram for entry selection logic that may be employed, in some embodiments of the present invention, to facilitate dynamic and selective alteration of certain address translations.

FIG. 5 depicts entry selection logic that may be employed, in some embodiments of the present invention, to facilitate dynamic and selective alteration of certain translations from effective addresses. Based on values from individual entries of address translation table 9, from PRID storage 43 and from activation control circuitry 44, instances of selection logic 81 associated with individual entries of address translation table 9 (implementing a TLB) contribute to generation, if appropriate of a TLB entry hit signal. As will be appreciated by persons of ordinary skill in the art, although one exemplary configuration of combinatorial logic is illustrated, numerous other functionally equivalent logic blocks may also be suitable.

In the illustrated implementation, a reserved value in the portion of the EID field of the associated TLB entry is used to code operation based on externally source values. Accordingly, gate 85 is used to detect the reserved value (TLB_ENTRY[EID[0:3]]==1111) and in conjunction with an EXT_PID_ENABLE signal (see gate 92) from activation control circuitry 44 drives a selection input of multiplexer 91, thereby selecting either an unmodified portion PID[6:7] from PID storage 43 or an externally sourced EXT_PID[6:7] portion, for inclusion in a MODIFIED_PID[6:7] which is, in turn, supplied (together with PID[0:5]) to comparator 94 for comparison against TLB_ENTRY[EID[0:7]]. If comparator 94 indicates a match then, assuming a match (as well) between virtual page numbers of the effective address (EFFECTIVE_ADDRESS[VPN]) and the TLB_ENTRY[VPN] of a valid entry (TLB_[V]==TRUE), a TLB entry hit is signaled at the output of gate 96. In the illustrated logic, a reserved value of yy=11 (i.e., TLB_ENTRY[EID[6:7]]==11) is also detected and signals comparator 94 to mask comparison of bits TLB_ENTRY[EID[6:7]] with corresponding bits (PID[6:7]) of the PID, thereby implementing the match without regard to the externally sourced value(s)-based operation illustrated above with reference to entries 104 and 105 (see FIG. 4).

An additional comparator 86 supports matching of shared pages (coded as TLB_ENTRY[EID[0:7]=0000000]) without regard to the PID value from PID storage 43. Although any of a variety of logic implementations for selection logic 83 (of FIG. 2) will be appreciated based on the foregoing disclosure, in some embodiments, selection logic 83 simply eliminates from the more complex selection logic 81 implementation, gates 85, 92 and 93, together with multiplexer 91 and directly compares TLB_ENTRY[EID[0:7]]; with corresponding bits (PID[0:7]) at a private page comparator analogous to that illustrated as 94 and detects shared pages using a comparator analogous that illustrated as 86.

As is described herein, in some embodiments of the present invention, individual instances of selection logic 81 may be used to facilitate the external sourcing behavior based on contents of the corresponding EID fields 52, such that particular reserved EID field values (e.g., EID values 1111xxyy, where usages of xx and yy values are as described above) code the external sourcing behavior. Thus, in some embodiments, instances of selection logic associated with each address translation entry (including those illustrated in FIG. 2 as the comparatively simpler selection logic 83) may instead be patterned on the more complex selection logic 81. Since such instances of selection logic 81 predicate external sourcing behaviors on presence of particular reserved EID values, those instances operate generally in accord with the description of selection logic 83 when no selective EID value is encoded in the associated address translation entry. Accordingly, for implementations in which additional complexity of the selection logic 81 is not prohibitive when replicated over the depth of address translation table 9, all (or a substantial majority of) instances of selection logic may optionally be implemented in accord with selection logic 83. Nonetheless, for generality, embodiments that include both forms of selection logic have been described herein.

Other Embodiments

Although the invention is described herein with reference to specific embodiments, various modifications and changes can be made without departing from the scope of the present invention as set forth in the claims below. For example, while techniques have been described that facilitate calibration and/or tuning of parameters and/or filter coefficients in a control system application using dynamic and selective alternation of address translations, the described techniques have broad applicability to other applications as well. Similarly, although the described techniques may be employed to facilitate virtual-to-physical address translations in a page-oriented memory model with process-centric virtual address spaces, the techniques are not limited thereto.

Embodiments of the present invention may be implemented using any of a variety of different information processing systems. Accordingly, while FIG. 1 together with its accompanying description illustrates simple data processing system implementation that facilitates description of the invented techniques, the design of that data processing system is merely illustrative. More particularly, while a single processor design with a conventional memory bus is illustrated, multiple processors, multiple cores and/or multi-path, point-to-point interconnect fabrics are envisioned as well. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, system and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques know in the art is used so as to avoid obfuscation or distraction from the teachings of the present invention.

In general, the terms "program" and/or "program code" when used herein describe a sequence or set of instructions designed for execution on a computer system. As such, such terms may include or encompass subroutines, functions, procedures, object methods, implementations of software methods, interfaces or objects, executable applications, applets, servlets, source, object or intermediate code, shared and/or dynamically loaded/linked libraries and/or other sequences or groups of instructions designed for execution on a computer system.

All or some of the program code described herein, as well as any software implemented functionality of information processing systems described herein, may be accessed or received by elements of an information processing system, for example, from computer readable media or via other systems. In general, computer readable media may be permanently, removably or remotely coupled to an information processing system. Computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and tangible media used for storage incident to data transmission via computer networks, point-to-point telecommunication equipment, and carrier waves or signals, just to name a few.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. An apparatus comprising:
at least one processor core, the at least one processor core suitable for executing a plurality of processes, wherein each of the processes has a respective address space; and
a memory management unit coupled between the at least one core and an interface to memory, the memory management unit configured to map from effective addresses in respective ones of the address spaces to physical addresses in the memory wherein mappings performed by the memory management unit are based on address translation entries of an address translation table,
the memory management unit including entry selection logic that, for a first subset of less than all of the processes, selects from amongst plural alternative mappings coded in respective ones of the address translation entries, wherein for at least some effective addresses mapped for a particular process of the first subset, selection of a particular one of the address translation entries is based on one or more externally sourced values.

2. The apparatus of claim 1,
wherein, for the particular process of the first subset, the selection of a particular address translation entry is based on the one or more externally sourced values, but only for a second subset of less than all effective addresses mapped for the particular process.

3. The apparatus of claim 1,
wherein the entry selection logic identifies the first subset of processes based on correspondence of respective process identifiers with respective task identifiers coded as part of a lookup tag in respective address translation entries of the address translation table.

4. The apparatus of claim 1,
wherein, for the first subset of processes, the entry selection logic modifies, based on the externally sourced values, at least some respective process identifiers presented for match against lookup tags in respective address translation entries of the address translation table.

5. The apparatus of claim 4,
wherein the modification performed by the entry selection logic includes overloading a sub-portion of the respective process identifiers presented for match, wherein the overloading is with values that correspond to the externally sourced values.

6. The apparatus of claim 4, wherein for at least some lookup tag encodings for address translation entries corresponding to the first subset of processes, the entry selection logic signals a hit without regard to the externally sourced values.

7. An apparatus comprising:
at least one processor core, the at least one processor core suitable for executing a plurality of processes, wherein each of the processes has a respective address space; and
a memory management unit coupled between the at least one core and an interface to memory, the memory management unit configured to map from effective addresses in respective ones of the address spaces to physical addresses in the memory wherein mappings performed by the memory management unit are based on address translation entries of an address translation table,
the memory management unit including entry selection logic that, for a first subset of less than all of the processes, selects from amongst plural alternative mappings coded in respective ones of the address translation entries, wherein for at least some effective addresses mapped for a particular process of the first subset, selection of a particular one of the address translation entries is based on one or more externally sourced values, wherein, for the particular process of the first subset, the selection of a particular address translation entry is based on the one or more externally sourced values, but only for a second subset of less than all effective addresses mapped for the particular process, and wherein the entry selection logic identifies those of the address translation entries corresponding to the second subset based on task identifier values coded as part of a corresponding lookup tag in the address translation table.

8. The apparatus of claim 7, wherein operant effective-to-physical address translations performed by the memory management unit relative to (i) the first subset of processes and (ii) a second subset of effective addresses accessed thereby are subject to dynamic runtime selection in accord with the externally sourced values.

9. The apparatus of claim 7, wherein the externally sourced values are based on one or more of:
external signals received from an off-chip source;
programmable values settable by hardware or software external to the memory management unit and processor core; and
signals, events or values supplied by a debug or in-circuit test facility.

10. The apparatus of claim 7, wherein the effective addresses correspond to virtual memory pages,
wherein the address translation table is configured as a translation lookaside buffer that caches virtual-to-physical page mappings, and
wherein, relative to less than all of the virtual-to-physical page mappings, the entry selection logic signals a hit in the translation lookaside buffer based at least in part on correspondence of a lookup tag with a process identifier modified in accord with the externally supplied values.

11. The apparatus of claim 7, further comprising:
at least a portion of the memory.

12. A method of dynamically altering a subset of memory mappings for a subset of processes executing in a computational system, the method comprising:
maintaining a plurality of address translation entries, wherein individual ones of the address translation entries are associated with respective tags with at least a portion thereof that corresponds to a process identifier for a respective one of the processes executing in the computational system;
using a memory management unit and based on respective ones of the address translation entries, mapping from effective addresses referenced by the processes to corresponding physical addresses in memory,
wherein for a subset of less than all of the tags and corresponding processes, the memory management unit selects from amongst alternative ones of the address translation entries based on externally supplied values.

13. The method of claim 12, further comprising:
partitioning coding space for the tags into at least first and second portions, wherein only the first portion is subject to the selection from amongst alternative ones of the address translation entries based on the externally supplied values.

14. The method of claim 13, wherein the second portion constitutes a substantial remaining entirety of the tag coding space.

15. A method of dynamically altering a subset of memory mappings for a subset of processes executing in a computational system, the method comprising:
maintaining a plurality of address translation entries, wherein individual ones of the address translation entries are associated with respective tags with at least a portion thereof that corresponds to a process identifier for a respective one of the processes executing in the computational system;
using a memory management unit and based on respective ones of the address translation entries, mapping from effective addresses referenced by the processes to corresponding physical addresses in memory, wherein for a subset of less than all of the tags and corresponding processes, the memory management unit selects from amongst alternative ones of the address translation entries based on externally supplied values; and
partitioning coding space for the tags into at least first and second portions, wherein only the first portion is subject to the selection from amongst alternative ones of the address translation entries based on the externally supplied values,
wherein even within the first portion of the tag coding space, for at least a subset of the tag values therewithin, the selection by the memory management unit of an address translation entry is performed without regard to the externally supplied values.

16. The method of claim 15,
wherein the tag portions that correspond to respective processes are coded using a plurality N of bit positions,
wherein the first portion of the tag coding space is specified based on a predefined pattern coded in M of the N bit positions, and
wherein the selection from amongst alternative ones of the address translation entries is performed by overloading Y of the N bit positions with values that correspond to the externally supplied values.

17. A method of operating a computational system, the method comprising:
executing plural processes on one or more cores of the computational system, each of the processes addressing memory in accordance with a corresponding set of address translations maintained by the computational system;

for at least a first one of the plural processes and for less than all address translations of the set corresponding to the first process, providing at least a pair of alternative address mappings dynamically selectable at runtime based on an externally sourced value; and for at least a second one of the plural processes, mapping addresses without regard to the externally sourced value.

18. The method of claim 17, further comprising:

for at least some of the address translations of the set corresponding to the first process, mapping addresses without regard to the externally sourced value.

19. The method of claim 17, further comprising:

for both the first and second processes, mapping respective addresses based on respective address translation entries of an address translation table, and wherein, relative to at least some of memory accesses performed by the first process, entry selection logic of a memory management unit modifies, based on the externally sourced value, a corresponding process identifier presented for match against lookup tags encoded in respective address translation entries of the address translation table.

20. The method of claim 19, wherein the modification performed by the entry selection logic includes overloading a sub-portion of a process identifier presented for match, wherein the overloading is with a value that correspond to the externally sourced value, and wherein for at least some lookup tag encodings for address translation entries corresponding to memory accesses performed by the first process, the entry selection logic signals a hit without regard to the externally sourced value.

* * * * *